United States Patent
Elliott (10) Patent No.: US 7,564,812 B1
(45) Date of Patent: Jul. 21, 2009

(54) METHOD AND APPARATUS FOR VARYING TIMES/CHANNELS OF BROADCAST BEACONS

(75) Inventor: Brig Barnum Elliott, Arlington, MA (US)

(73) Assignee: BBN Technologies Corp, Cambridge, MA (US)

( * ) Notice: Subject to any disclaimer, the term of this patent is extended or adjusted under 35 U.S.C. 154(b) by 1347 days.

(21) Appl. No.: 10/164,237

(22) Filed: Jun. 6, 2002

(51) Int. Cl.
   *H04W 4/00* (2006.01)
(52) U.S. Cl. .................. 370/329; 370/478; 370/341; 455/450
(58) Field of Classification Search .................. None
   See application file for complete search history.

(56) References Cited

U.S. PATENT DOCUMENTS

| | | | |
|---|---|---|---|
| 5,483,537 A * | 1/1996 | Dupuy | 370/337 |
| 5,513,210 A * | 4/1996 | Vook et al. | 375/133 |
| 5,515,369 A | 5/1996 | Flammer, III et al. | |
| 5,583,866 A * | 12/1996 | Vook et al. | 370/312 |
| 5,737,318 A * | 4/1998 | Melnik | 370/254 |
| 6,907,228 B1 * | 6/2005 | Lohtia et al. | 455/62 |
| 6,967,944 B2 * | 11/2005 | Choi | 370/348 |
| 7,110,380 B2 * | 9/2006 | Shvodian | 370/336 |
| 7,120,138 B2 * | 10/2006 | Soomro et al. | 370/343 |
| 2002/0071413 A1 * | 6/2002 | Choi | 370/337 |
| 2003/0016732 A1 * | 1/2003 | Miklos et al. | 375/132 |
| 2003/0163579 A1 * | 8/2003 | Knauerhase et al. | 709/230 |

OTHER PUBLICATIONS

Pending U.S. Appl. No. 09/584,973, filed Jun. 1, 2000, Elliott et al.

* cited by examiner

*Primary Examiner*—Bob A Phunkulh
(74) *Attorney, Agent, or Firm*—Ropes & Gray LLP (57) ABSTRACT

Method and apparatus for varying the times and channels of broadcast beacons. The method and apparatus make it more difficult to monitor and/or disrupt such beacon transmissions. In one embodiment, pseudo-random times and pseudo-random channels are selected for transmitting the beacon messages. Preferably these times and channels are included in a beacon schedule which is transmitted with the beacon messages. In select embodiments, the beacon messages include schedules for both the transmitting node and other nodes, so that all of the nodes in the network may quickly learn the beacon schedules of the other nodes.

26 Claims, 7 Drawing Sheets

METHOD AND APPARATUS FOR VARYING TIMES/CHANNELS OF BROADCAST BEACONS

FIELD OF THE INVENTION

The present invention relates to a method and apparatus for varying the times and channels of broadcast beacons in "ad hoc" wireless networks, and more particularly, to a method and apparatus for making it difficult to monitor and/or disrupt such beacon transmissions.

BACKGROUND OF THE INVENTION

In an "ad hoc" wireless network, all nodes of the network are equipped with wireless communications transceivers. Some of the nodes, commonly known as routers or switches (hereinafter referred to as "routers"), are capable of directing traffic (messages) on the network, e.g., network routing functions. Other of the nodes, commonly known as "endpoints," are sources and/or destinations of data traffic.

Each node in an "ad hoc" wireless network typically executes a set of algorithms and conforms to a set of networking protocols which enable the nodes to locate other nodes. The protocols also enable the nodes to determine paths through the network for sending and receiving data traffic from source to destination. Additionally, the protocols enable the nodes to detect changes and/or repair ruptures in the network, which may occur when nodes enter, move, fail or leave the network, when battery-power changes, when communication path characteristics change over time, and the like.

Certain types of "ad hoc" wireless networks employ beacons as a means by which nodes can discover or convey information to other nearby nodes. A beacon is a broadcast transmission that can be received by some or all of the nodes within transmission range—as opposed to a point-to-point transmission to a particular node. In some network schemes, all of the nodes in the network can broadcast beacons; in other networks, only a subset of the nodes can broadcast beacons.

Typically beacons contain various fields of information, such as an identification of the node that is transmitting the beacon, forwarding error correction information (to ensure correct receipt of the beacon), and other fields depending on the type of wireless networking protocols employed in the network.

Beacons have a substantial drawback when used in military networks. In such tactical situations, an adversary or enemy may try to monitor and/or disrupt network communications. Beacon messages are particularly easy for an enemy to notice, because they are generally sent at more or less regular intervals, at high power, and often on a well-known wireless channel. The enemy can thus readily identify all of the nodes in the network simply by monitoring their beacon transmissions. In addition, the enemy can jam and/or disrupt the network by delivering jamming energy at those times and places where nodes are expected to beacon.

SUMMARY OF THE INVENTION

Systems and methods consistent with the present invention can be used to secure and more readily prevent an adversary from exploiting certain features of beacon transmissions. In one aspect, the invention enables selection of pseudo-random times and pseudo-random communication channels, on which to transmit beacons. This element of randomness makes it significantly harder for an enemy to detect, monitor, and/or jam the beacon messages. Of course, it also makes it harder for a "friendly" node to know when to listen for beacon messages. Thus, in another aspect of the invention a method is provided in which information about a plurality of beacon schedules is disseminated through the network. Thus, when a new friendly node manages to receive even a single beacon message from any nearby network node, it can learn the beacon schedules for other nodes in the network and quickly learn all of the relevant beacon schedules.

In one embodiment, the present invention can be used to reduce the probability of interception, detection, and/or jamming of communications on wireless networks. However, rather than being focused on trying to mask the data messages being sent between nodes, the present invention focuses on the network control messages themselves, and in particular, on the timing and transmission channel of the broadcast beacons.

Another embodiment of the present invention enables a node to adapt its power requirements to learned beacon schedules. For example, where one or more nodes learn the beacon schedules for other nodes in the network, the node can apply power to its receiver (the whole or a portion thereof and/or other components for processing received beacons, such as a correlator for determining an underlying signal pattern, e.g., in spread spectrum systems) only at those times when it expects another node to transmit a beacon message. This will greatly reduce the power required for node operation, because powering a receiver utilizes a great deal of energy. Use of this technique enables nodes to be run for longer intervals when powered by self-contained power units, such as batteries.

In one embodiment, a method of scheduling beacon messages is provided including the steps of selecting random times for transmitting the beacon messages, and selecting random channels for transmitting the beacon messages.

In a further embodiment, a beacon message is provided which includes an identification of a node and a random beacon transmission schedule for that node.

In yet another embodiment, a method of generating a beacon message is provided including the steps of providing an identification of a node and a random beacon transmission schedule for that node and incorporating the identification and schedule in a beacon message.

In another embodiment, a method of receiving a beacon message is provided including steps of extracting a random beacon transmission schedule for a node from the beacon message, listening at a receiver for a beacon message at a time and channel specified in the schedule, and extracting at least one additional random beacon transmission schedule for another node from any beacon message heard.

In yet another embodiment, an apparatus is provided for generating a beacon message including a node having a node identifier, a random number generator for generating a node transmission schedule, and a processor for generating a beacon message including the node identifier and the schedule.

In another embodiment, a method of joining a transmission network is provided including steps of selecting a random channel, listening on the selected channel for an amount of time, and if no beacon message is heard on the channel during the amount of time, repeating the selecting and the listening steps.

In another embodiment, an apparatus is provided for transmitting beacons in a wireless ad hoc network including at least one node, the node i) transmitting beacons containing a beacon schedule, ii) selecting random times and random channels for transmission of beacons, and iii) storing the selected times and channels in the beacon schedule.

In yet another embodiment, a method for transmitting beacons in an ad hoc wireless network is provided including the steps of transmitting beacons containing a beacon schedule, selecting random times and random channels for transmission of beacons, and storing the selected times and channels in the beacon schedule.

In yet another embodiment, a computer-executable software code is provided stored on a computer-readable medium, the computer-executable code being for facilitating the transmission of beacons in a wireless network, the computer-executable code including i) computer-executable code for transmitting beacons containing a beacon schedule, ii) computer-executable code for selecting random times and random channels for transmission of beacons, and iii) computer-executable code for storing the selected times and channels in the beacon schedule.

In yet another embodiment, a network communications apparatus is provided including means for transmitting beacons containing a beacon schedule, means for selecting random times and random channels for beacon transmissions, and means for storing the selected times and channels in the beacon schedule.

The foregoing features of systems and methods consistent with the present invention will become more apparent from the following detailed description of certain preferred embodiments, taken in conjunction with the accompanying drawings. It is to be understood that both the foregoing general description and the following detailed description are exemplary and explanatory only and are not restrictive of the invention, as claimed.

DETAILED DESCRIPTION

Systems and methods consistent with the present invention are particularly useful in ad hoc wireless networks, i.e., a network formed by a plurality of mobile communications nodes. However, such systems and methods are also applicable to other types of networks, including networks composed of stationary nodes (such as sensor networks), those composed of a mixture of moving and stationary nodes, and so forth.

In ad hoc wireless networks various nodes may be mobile. A high level of node mobility necessitates that the router nodes be able to respond quickly to changes in the network. More specifically, beacon messages sent by a node that is moving allows new neighbors, i.e., nodes that are now coming into the wireless communication range of the moving node, to discover the moving node. Similarly, it allows nodes that are falling out of wireless communication range to determine that the moving node is passing out of range.

Figure 1:
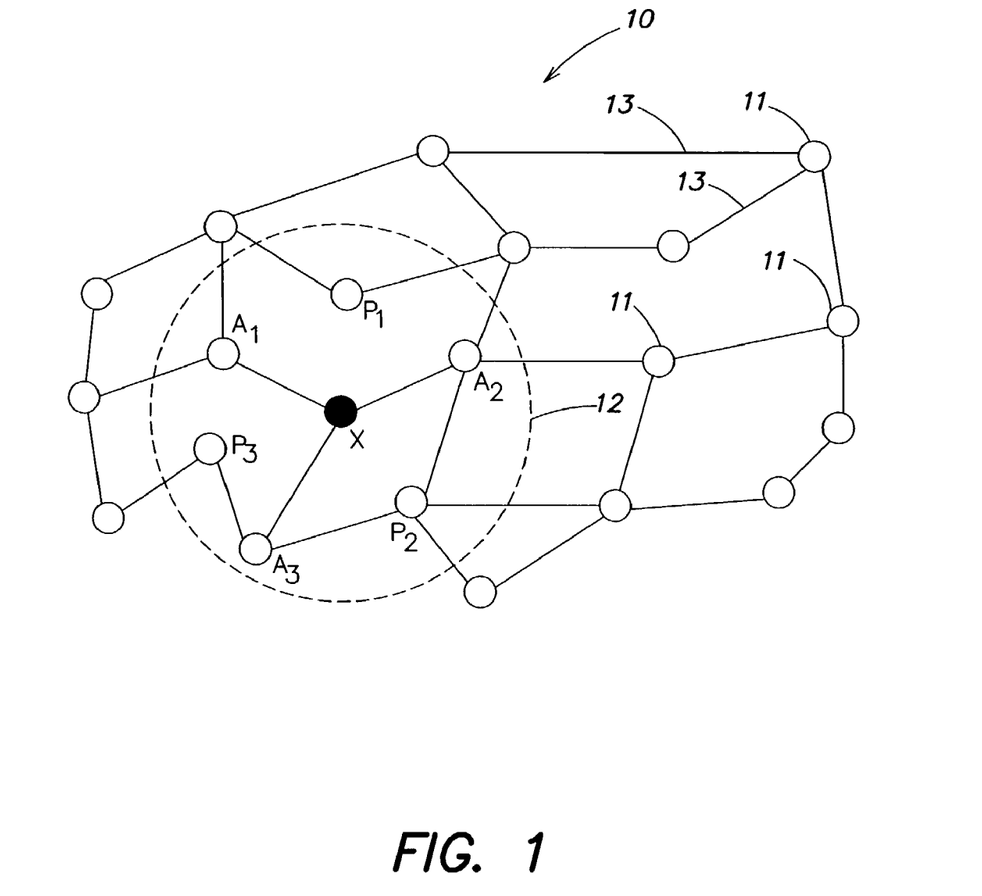
FIG. 1 is a schematic diagram illustrating one example of an ad hoc wireless network configuration, the network including a plurality of nodes and having a select node X with a transmission range designated by a dashed circle.

FIG. 1 is a schematic diagram of a plurality of radio-frequency transmission nodes in an ad-hoc wireless network 10, according to one embodiment of the present invention. The circles 11 represent router or endpoint nodes in the network. The solid lines 13 represent "neighbor relations" between nodes, i.e., a line connects two nodes that are capable of forwarding messages ("traffic") from one node to the other. A given node, here designated as node X, has some limit to its radio range (or infrared, acoustic, magnetic or whatever other wireless communications channel it is using). This limit is shown as a dashed circle 12 in FIG. 1. In reality, the range is generally not a regular shape as it depends very much on the terrain, reflections from nearby buildings and vehicles, other wireless interference, and so forth. FIG. 1 shows node X with some number of actual neighbors (nodes A1-A3) and a number of potential neighbor nodes (P1-P3), within range 12. Potential neighbors are nodes within X's range that could be used for forwarding messages, but which are not currently being so used.

While FIG. 1 illustrates a particular interconnection of the various nodes or stations shown, this configuration of connections is not limiting and other patterns of connections may be used in accordance with the present invention. Moreover, the pattern of connections may change during operation, both to accommodate the introduction of new stations and to allow for the withdrawal or movement of one or more of the nodes.

Figure 2:
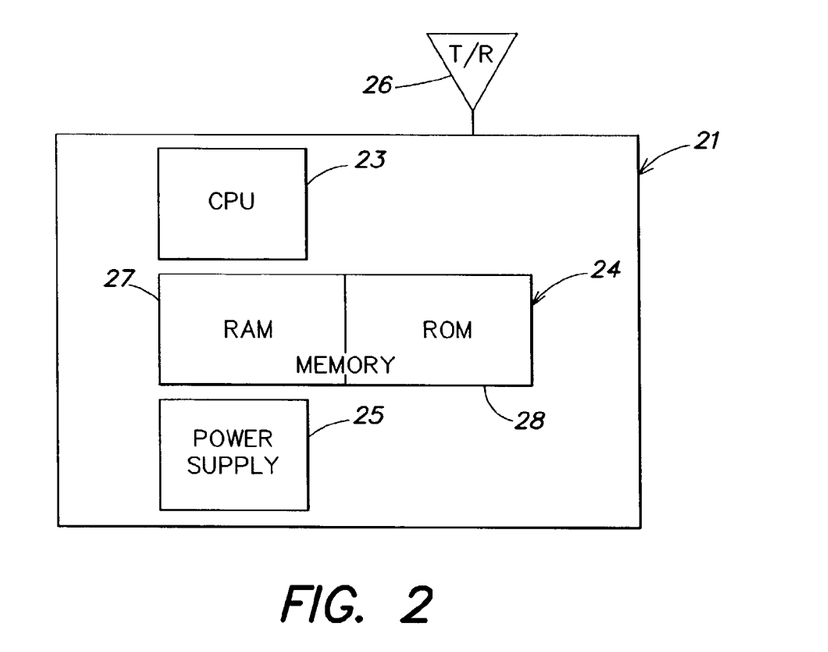
FIG. 2 is a block diagram of one embodiment of a communications node.

Each node 11 in network 10 is equipped with a wireless communications transceiver. FIG. 2 depicts an exemplary node 21 that includes a central processing unit (CPU) 23, a memory 24 comprising RAM 27 and ROM 28 (suitable for storing computer-executable software therein), a power supply 25, and a transceiver 26 (e.g., a transmitter and a receiver). The mode of operation of each router and endpoint node is controlled by an imbedded microprocessor (e.g., the CPU) and the method of operation described in this embodiment is intended to be implemented automatically by the programming of the microprocessors.

Figure 3:
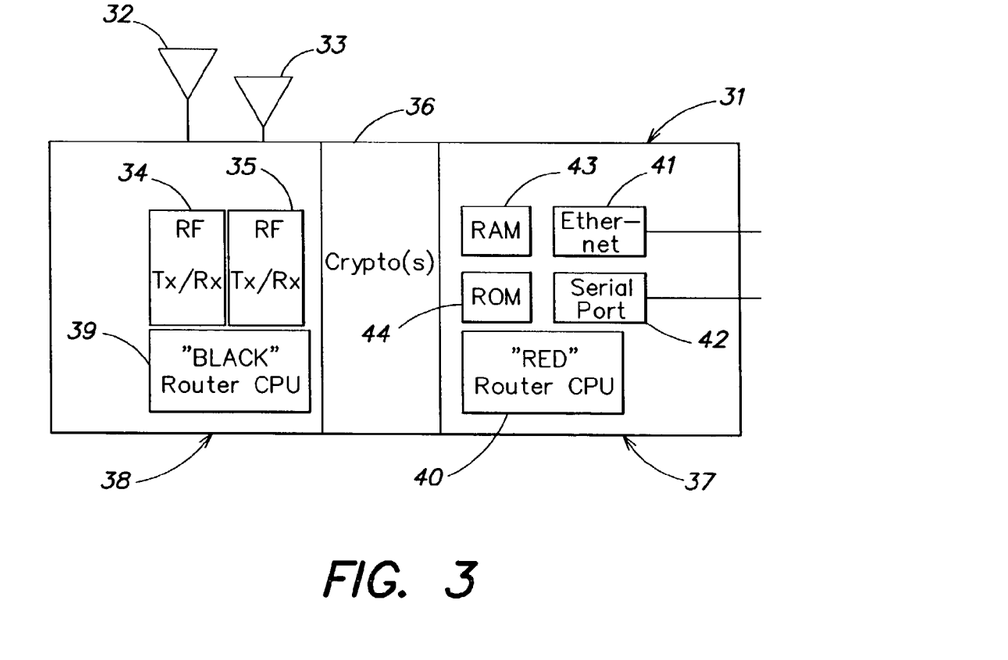
FIG. 3 is a block diagram of another embodiment of a communications node.

Alternatively, a mobile station may include more than one transmitter and/or more than one receiver, and optionally other interfacing ports, such that the station is able to simultaneously communicate with more than one other station. Communication with multiple stations can occur, for example, through different channels (or "communication links"), and/or by transmitting specific identifying information (or "coded information") for each intended source or target. FIG. 3 shows an alternative hardware scheme for a node 31 in an ad hoc wireless network. This particular example has two antennae 32 and 33, a different antenna being associated with each of two radio frequency transceivers (RF TX/RX) 34 and 35. It also includes a cryptographic unit ("crypto") 36 that partitions the hardware into a red side 37 and a black side 38. On the black side, there is a router CPU 39 associated with the two radio transceivers. On the red side, there is another router CPU 40 associated with RAM and ROM memory, and two wired network ports, an Ethernet port 41 and a serial port 42.

Determination of a Beacon Schedule

One aspect of systems and methods consistent with the present invention is that each node that will transmit "beacon messages" must determine a schedule that will govern: a) when the beacons are to be transmitted, and b) on what channel the beacons will be transmitted.

As an example, a given node may determine a portion of a beacon schedule as follows: transmit beacon number 1 at 3.85 seconds from now at 42.356 MHz (mega-hertz); transmit beacon number 2 at 17.93 seconds after that at 13.447 MHz; and so forth. Such a schedule may have an indeterminate number of entries in it, in order to govern the times and channels at which beacons will be transmitted for an indefinite future.

The schedule may incorporate random times and random channels according to the present invention. One method to provide such random times and channels is by using a pseudo-random number generator (PRNG), and providing an initial "seed" value. The PRNG will produce a series of seemingly random numbers in sequence, which can then be used to derive timing and channel information for the beacons.

Various implementations of a pseudo-random number generator (PRNG) are commonly available in hardware and/or software form. For example, a roulette wheel is an example of a pseudo-random number generator. It is an example of what physicists call a chaotic system, a system in which a small change in the initial conditions (the throw, the mass of the ball, the diameter of the wheel, and so forth) can produce a large change in the state to which the system evolves (the resulting number). The outcome appears random because it exhibits no obvious pattern and is difficult, in practice, to predict.

Like the roulette wheel, a computer can produce a sequence of numbers that is random in the same sense. In fact, using a mathematical model, the computer could simulate the physics of the roulette wheel and throw a simulated ball at a slightly different angle each time in order to produce each number in the sequence. Even if the angles at which the computer throws a simulated ball follow a consistent pattern, the simulated dynamics of the wheel would transform these tiny differences into what amounts to an unpredictable sequence of numbers. Such a sequence of numbers is called a pseudo-random sequence, because it only appears random to an observer who does not know how it was computed. The sequence produced by a pseudo-random number generator can pass all normal statistical tests of randomness. See W. Daniel Hillis, "The Pattern on the Stone," published by Basic Books, 1998, pp. 66-67.

As an alternative to a pseudo-random number generator, a random number generator based on unpredictable physical processes may also be employed. Typical examples include random sequences based on thermal noise in electronic devices, on the decay of radioactive materials, on the movement of viscous fluids within Lava Lamps, and so forth. These "physical" random number generators may have some advantages over pseudo-random number generators in that their sequences may be harder to predict. However they may also have some drawbacks, e.g., they require specialized hardware to implement.

Systems and methods consistent with the present invention may employ either pseudo-random number sequences, or "physical" random number sequences, or indeed any other means of generating an unpredictable sequence of numbers.

Thus, as used herein "random" times, "random" channels, "random" numbers, "random" sequence, and "random" number generator include such pseudo-random, physical random and unpredictable times, channels, numbers, sequences and/or generators.

The previous example of a beacon schedule used a simple time-varying and frequency-hopping schedule for beacon transmissions. Although it appears to be a simple approach, it does add a significant amount of difficulty for an adversary seeking to monitor or disrupt transmissions since it makes it hard to predict when, and at what frequency, the next beacon message will be transmitted.

Other kinds of "channels" can be employed in the invention. For instance, one could use different Direct-Sequence spreading codes in a Code Division Multiple Access (CDMA) system. Alternatively, one could combine such CDMA codes with different center frequency bases selected by a PRNG. Thus, the present invention is not limited by the method of implementing the random channels.

Figure 4:
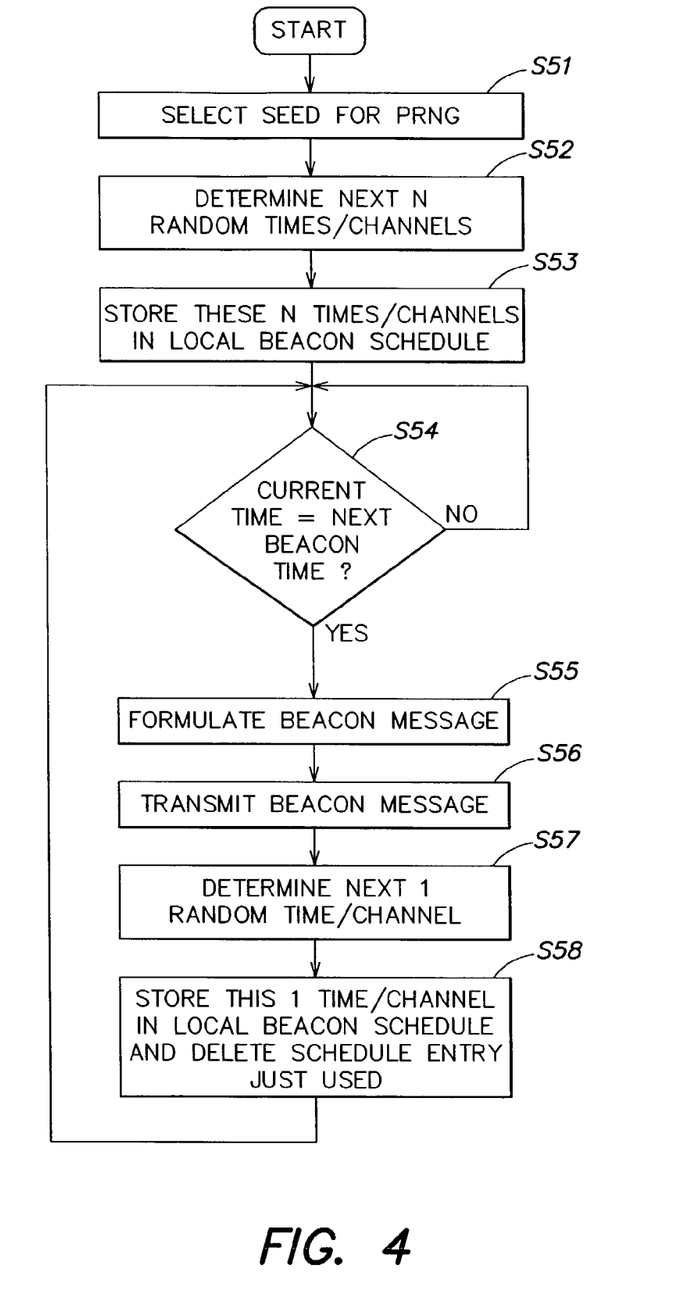
FIG. 4 is a flowchart illustrating one procedure for determining a beacon schedule and for transmitting broadcast beacons according to one method embodiment of the invention.

One algorithm or procedure for a node to determine its beacon schedule, and transmit beacons accordingly, is illustrated in the flowchart of FIG. 4. In step S51, a seed value is selected for a pseudo-random number generator (PRNG). In step S52, the next N random times/channels are determined based on the output of the PRNG. In step S53, these associated time/channel values (with respect to the current time) are stored into a local (i.e., specific to this one node) beacon schedule. In step S54, the schedule is inspected (with respect to the current time) to determine when/how to transmit the next beacon. In step S55, a beacon message is formulated. In step S56, the beacon message is transmitted in accordance with the scheduled time and channel. In step S57, a next one random time/channel is determined based on the PRNG. In step S58, this new time/channel entry is added to the local beacon schedule, and the scheduled entry just used is deleted. The procedure then goes back to step S54, to inspect the beacon schedule and determine when/how to transmit the next beacon.

In accordance with this algorithm, the schedule contains a "rolling window" of the next N times that the node will transmit beacons. When the next time occurs, the node uses the first item in the schedule, transmits a beacon accordingly, and then creates a new schedule entry that is "added on" after the items already in the window, and deletes the just used entry. In other embodiments for example, a predetermined number of next times/channels may be utilized before exiting (returning from) the routine.

Computer algorithms are usually expressed as programs. Since an algorithm refers to a sequence of operations, rather than the particular way they are described, it is possible to express the same algorithm in many different computer languages, or even to build it into hardware by connecting the appropriate registers and logic gates. Depending upon the specific implementation of the algorithm, it may use varying amounts of a computer's memory, varying amounts of processing time, and/or utilize more or less complex patterns of communication that are harder/easier to wire into hardware. Thus, FIG. 4 is exemplary of one embodiment of the invention, but the implementation details and relative order of steps are not limited.

Simple Format of a Beacon Message

In accordance with one embodiment of the invention, every beacon message from node X contains an indication of the next N times/channels at which beacons will be transmitted by node X. This allows any node that receives such a beacon to determine the next N times/channels that it should tune in to and receive subsequent beacons from the source node X.

Figure 5:
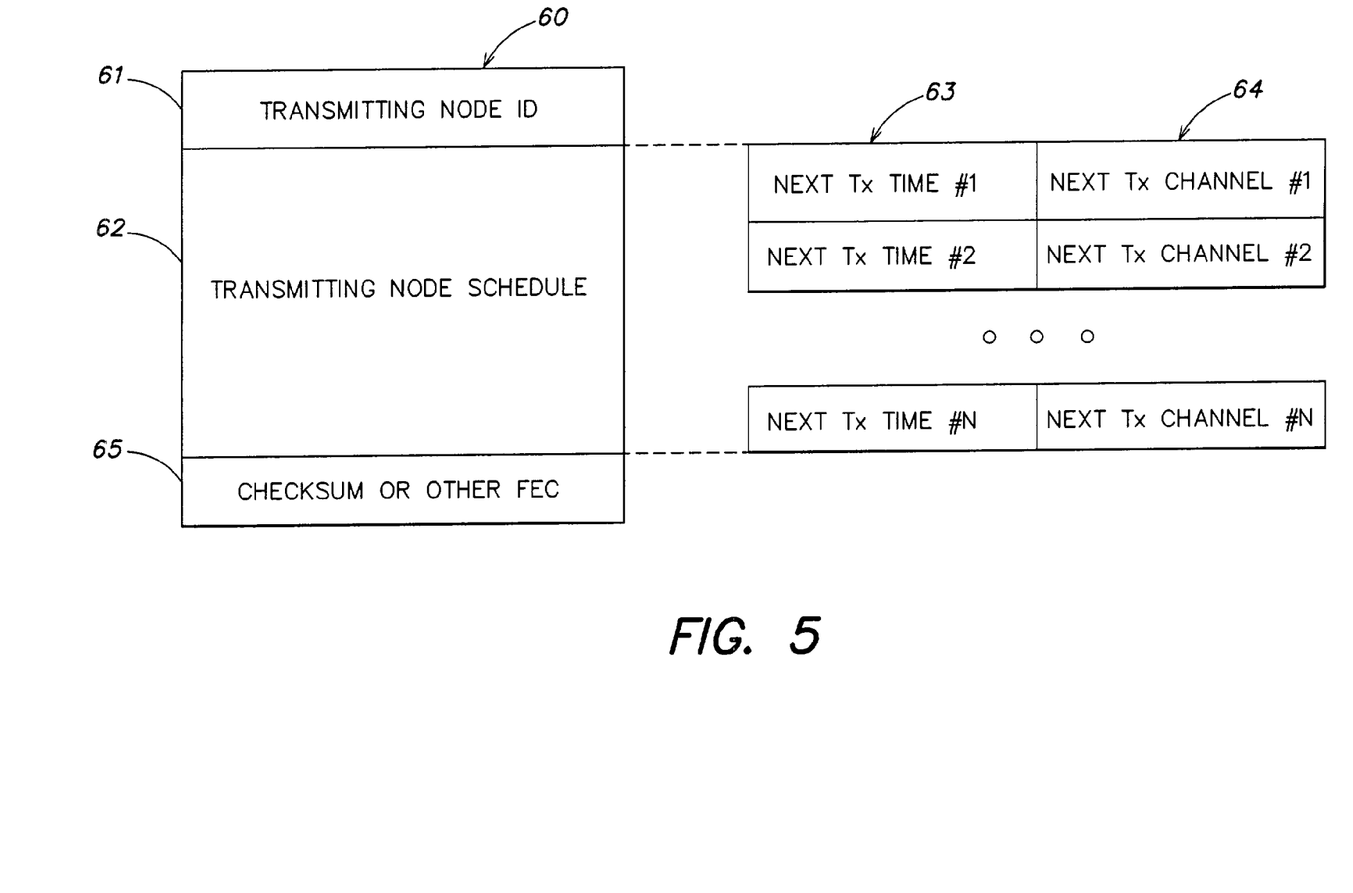
FIG. 5 is a diagram illustrating one format of a broadcast beacon in accordance with an embodiment of the invention.

FIG. 5 shows a sample format for such a beacon message 60. While the content and format of the beacon message may vary, the beacon should contain at least the transmitting node's ID 61, which is a unique identifier for that node, and all or a portion of the transmitting node's schedule 62. Here, the schedule includes the next one to N times 63 (and associated channels 64) that the transmitting node will transmit a beacon message. In this example, the beacon message further includes a checksum or other forwarding error correction (FEC) 65 to ensure reliable delivery.

Receipt of a Beacon Message

When a node receives a beacon message, it must extract the beacon schedule from the message and store it in memory, e.g., in a database. It then employs this database to tell it when to listen for beacons, and on which channel. Of course, it must have already had at least one database entry to tell it when to listen, and on what channel, for the beacon just received. This "chicken and egg problem" will be discussed in a subsequent section. Here, we just assume that the receiving node already has at least one schedule entry in its database.

Figure 6:
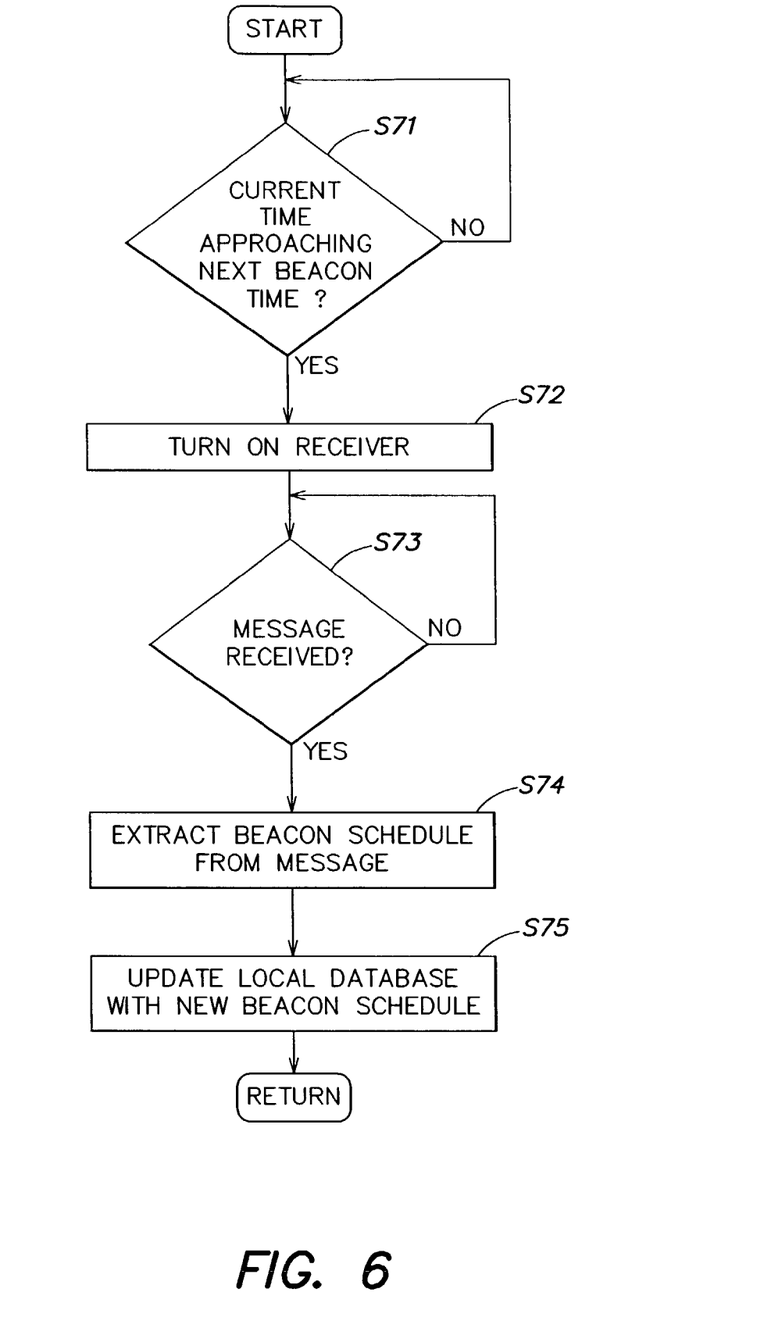
FIG. 6 is a flowchart illustrating a procedure for processing a received broadcast beacon according to one method embodiment of the invention.

The receiving node may perform an algorithm in accordance with the procedure shown in FIG. 6. In step S71, the receiving node determines whether the current time is approaching a time at which the next beacon will be transmitted, by finding the minimum of all entries in the local database, i.e., get ready to receive a beacon from the next node that is going to send one. In step S72, the receiver is turned on, shortly in advance of the anticipated transmission time, where the advance compensates for possible clock drifts between the transmitting node and this local node. In step S73, the node checks to see if the message was correctly received. If the message was correctly received, the beacon schedule information is extracted from the received beacon message in step S74. In step S75, the local database is updated with this new beacon schedule information.

In this embodiment, the beacon message contains schedules in "delta" time, e.g., the next transmission will be in 1.3 seconds from now. The receiving node must map this to its internal clock time as it copies the schedule into its local database, e.g., next transmission expected at 1:15:03.3 in my local clock time. Alternatively, all nodes in the network may employ a globally synchronized clock, e.g., by using global positioning system receivers.

Full Format of a Beacon Message

An alternative full format beacon message contains both the "local" schedule previously described, plus selected schedules of other nodes contained in the transmitting node's local schedule database. Thus, it contains both information about when this particular node is going to transmit its next beacon, and information about when other nodes in the network are going to transmit their beacons, respectively.

Figure 7:
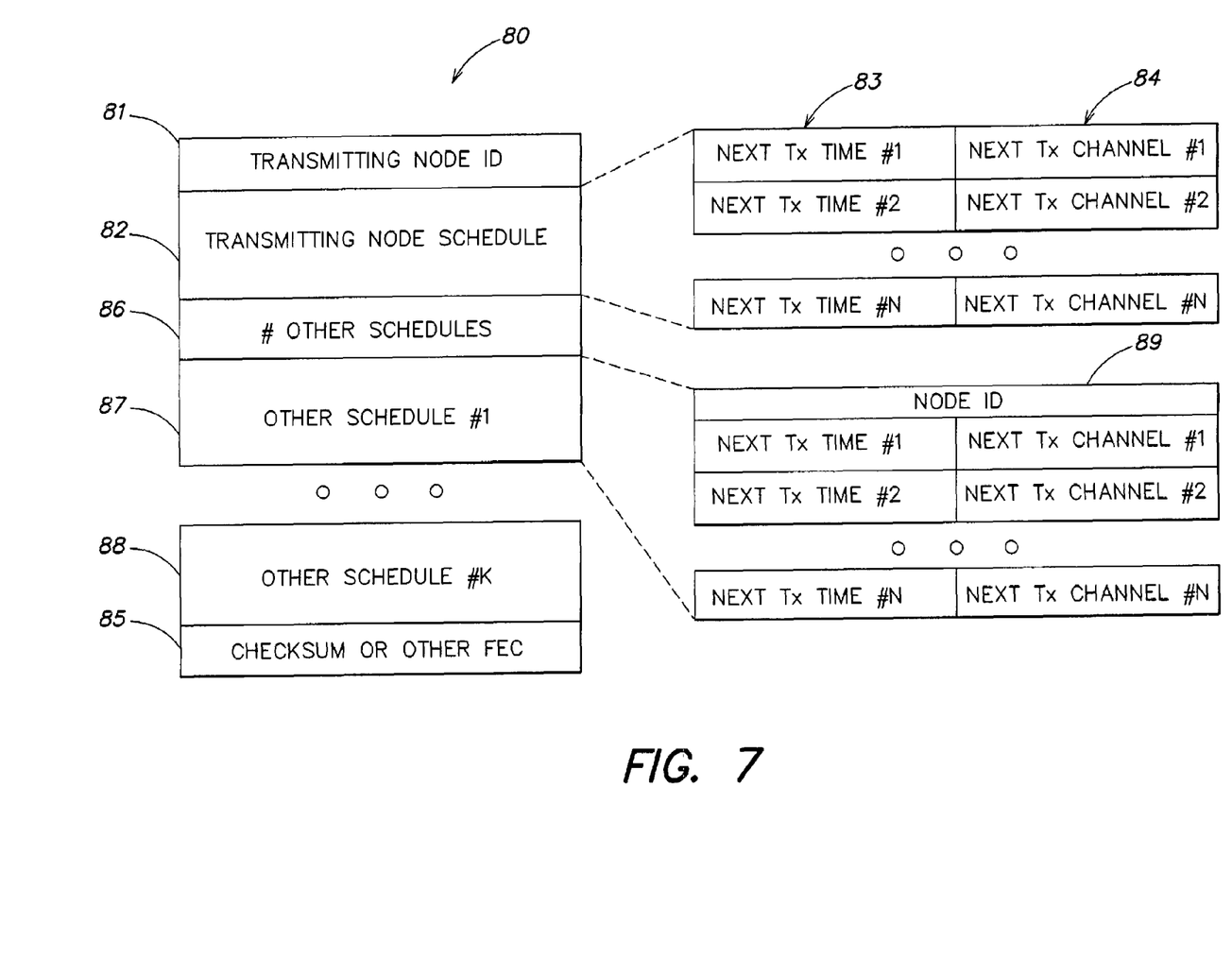
FIG. 7 is a diagram illustrating another format of a beacon message according to another embodiment of the invention.

FIG. 7 is a diagram illustrating a full format beacon message 80. The message is similar to the simple format, in regard to including the transmitting node's ID 81 and schedule 82, as well as a checksum or other FEC 85, but the message 80 also contains a variable number of "other" node schedules 86 in addition to the transmitter's own schedule 82. Here all schedules have the same internal format 83, 84, except that "other schedules" 87 to 88 also contain an associated identifying node ID 89 for each other schedule.

An advantage of using the full format beacon message is that when any given node receives a beacon message, it can then determine information about the beacon schedules for other nodes in the network. Thus, in small networks, it would be practical to include in one beacon message the beacon schedules of all other nodes. This would enable the receiving node to "tune in" to all nodes in the network and, if in range, receive all their beacons. Thus, just a single beacon message would provide enough information so that a node can fully join the network, i.e., receive all necessary beacons.

In larger networks, there may be too much schedule information to fit into a single beacon message. Then, the transmitting node may select some subset of the full schedule database to transmit. For example, it could be a random subset, a round robin subset, a subset that includes the "most important" set of nodes in the network, one that biases the selection of nodes according to some configured parameters or observed traffic flows, etc. However the subset is selected, the receiver will only learn this subset. But, once having learned this subset the receiver can effectively "bootstrap" itself to learn more about the full network, since it can immediately start "tuning in" on the other nodes listed in the subset schedule. These other nodes, in turn, are likely to transmit different subsets in their other beacon schedules, and so forth. As a result, even in a very large network, a given receiver can very quickly learn about most or all of the other nodes in the network.

Joining the Network

There was previously referenced a "chicken and egg problem" in regard to the receiving node already having at least one beacon schedule in its local database, so it can tell when and where to listen for the next beacon. How does a node, for example one that has just been powered on and that knows nothing about the network, manage to join the network?

Figure 8:
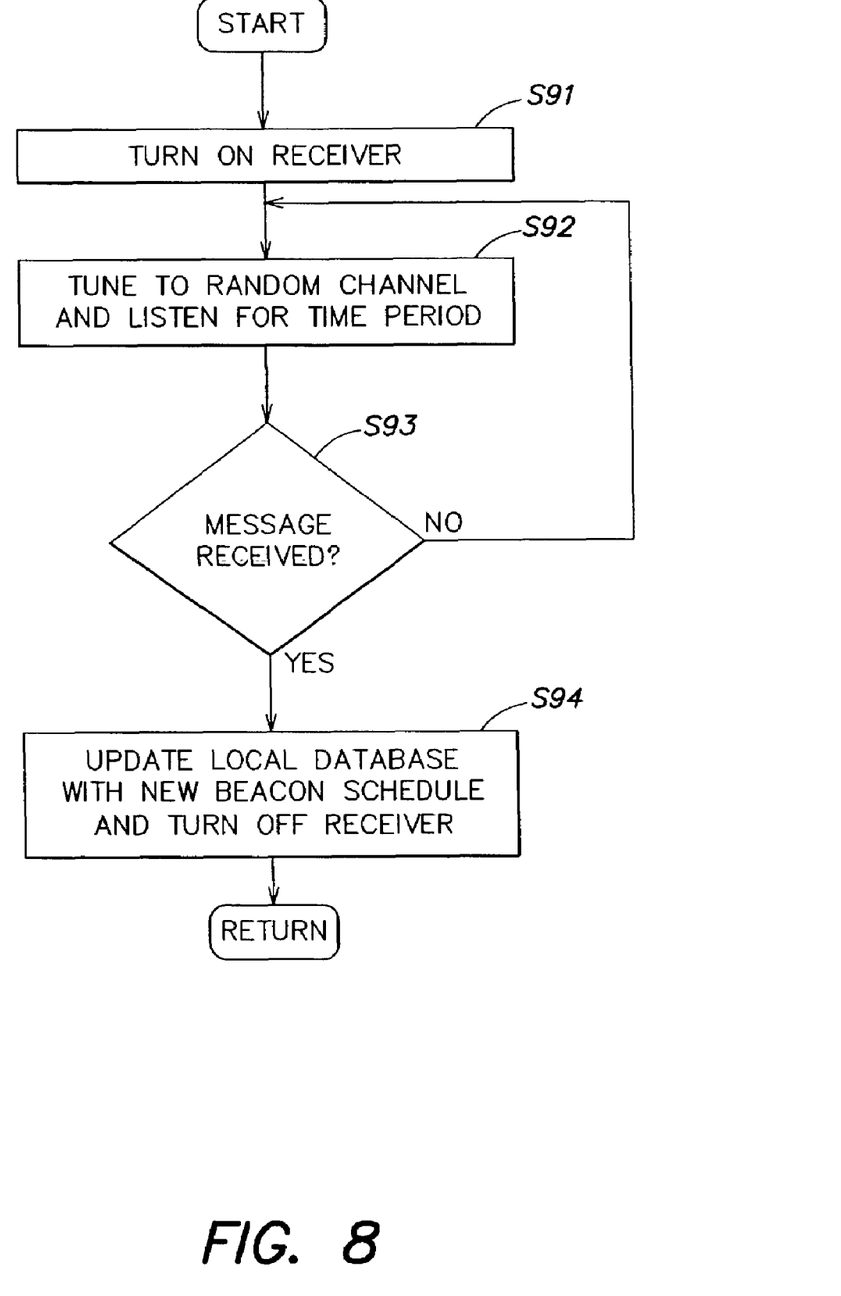
FIG. 8 is a flowchart illustrating a procedure allowing a node to join a network according to one embodiment of the invention; in addition, the procedure will allow a node to learn of a partitioned set of nodes according to another method embodiment of the invention.

One algorithm will now be described in connection with the flowchart illustrated in FIG. 8. In step S91, the joining node or "late arriver" turns on its receiver. In step S92, it tunes to a random channel and listens for some interval of time. In step S93, if no beacon message is received during this time interval, it returns to step S92. In step S93, if the node receives a beacon message it proceeds to step S94 and enters the beacon schedule information from that message into its local schedule database, and exits the procedure.

The late arriver can either transmit beacon messages while acting as a late arriver (waiting to hear from another node), or it may remain silent and only begin transmitting beacons at some later point, or indeed may never transmit any beacons.

In the described embodiment, the late arriver turns on its receiver for an indefinite amount of time, until it has begun to listen on a channel that is being used for a beacon message. Here, the late arriver must supply power to its receiver continuously until it finally joins the network. At this point, it may enter a power-saving mode (if so desired, i.e., it can turn on its receiver only at times for which a beacon is expected).

Excluding an Adversary

A question arises as to why an adversary (enemy) cannot do the same thing as a "late arriver" to learn all the beacon schedules and begin monitoring and/or jamming the network as desired.

To avoid an enemy joining the network, one solution is to encrypt all beacon messages. There are many possible systems for encrypting broadcast network messages. One approach is to give a shared secret key to all friendly nodes in the network, and let the friendly nodes encrypt and decrypt the message traffic using ciphers based on this key. The present invention is not limited, however, to any particular type or method of encryption.

With encrypted beacon messages, the enemy is denied the opportunity to act as a late arriver and, in fact, must continuously perform a late arriver algorithm in order to try to determine the next time at which a beacon is transmitted. Theoretically, if an enemy has a sufficiently advanced jamming device, it may be able to detect the beginning of a beacon transmission and quickly turn on its jamming device to disrupt the remainder of the transmission. This however, is generally difficult to do in practice and so the present invention has the desired effect of making it significantly more difficult for the enemy to monitor and/or jam the friendly nodes.

The Partitioned Network

One additional problem addressed by an embodiment of the present invention is the problem of a partitioned network. These are networks that have split apart into two or more portions, where the different portions do not hear one another. For example, one group of mobile radio nodes may have gone to one side of a hill, while another group went to the other side. When these two groups emerge back in radio range of one another, how do they learn of each other's existence? In particular, how can they learn of any of the beacon schedules for any of the radio nodes in the other partition.

Although this is similar to the late arrival problem, it is different in that the late arriver is aware that it does not know of any nodes in the network. By contrast, partitioned nodes are well aware of other nodes in the network, but may not be aware that there is another partitioned set of nodes that are already up and running, and can be joined.

One solution is that from time to time, one or more nodes in the network begins to execute the late arriver algorithm (e.g., of FIG. 8), even though the node has already joined in the network. The node may execute this algorithm for some fixed amount of time, and then revert to its normal behavior. Thus, when executing the late arriver algorithm, it will scan through random wireless channels to see if there some beacon being transmitted that it does not already know about. If so, it will incorporate the schedules from that beacon into its own local database, and thus quickly propagate the schedules to other nodes in its partition because they will be included in subsequent beacon transmissions. As a result, the partition will be quickly healed as all nodes learn about each other.

While the present invention has been described with respect to particular embodiments, it is to be understood that the invention is not limited to the disclosed embodiments. The present invention is intended to cover various modifications within the scope of the appended claims.

For example, the radio network of FIG. 1 has been described as having a select number and configuration of communication nodes. However, the network can include any number and configuration of nodes. Also, as will be appreciated by those skilled in the art, the methods and control logic described herein can be embodied in a programmable computer or computer-executable software that is stored on computer-readable media, for example, on a floppy disk, RAM, ROM, a hard disk, removable medium, flash memory, memory sticks, optical medium, magneto-optical mediums, etc.

Additionally the described methods, structures and functions are directed to wireless mobile communications stations that automatically configure themselves in a mobile communications network, with each mobile station directing its own discovery methods. However, in other embodiments such discovery mechanisms may be employed in only a subset of the entire set of network nodes. For instance, some nodes may perform discovery processes while other nodes merely learn network proximity information from these nodes, or indeed never learn such information at all. In yet other embodiments, some or all nodes may be stationary, e.g., in sensor networks. In still other embodiments, some nodes may employ discovery methods as claimed in this patent while other nodes employ other discovery methods (such as visual sightings, purely repetitive beaconing, etc.).

The current invention is applicable to network schemes in which all of the nodes beacon, and to networks in which only a subset of the nodes beacon. The invention is also applicable to routers, switches and like devices, as well as to endpoint devices in such networks.

Moreover, although the current embodiment has been described with reference to certain algorithms, other algorithms may be used to implement the features of the present invention.

Other embodiments of the invention will be apparent to those skilled in the art from consideration of the specification and practice of the invention disclosed herein. It is intended that the specification and examples be considered as exemplary only, with a true scope of the invention being indicated by the following claims.

The invention claimed is:

1. A method for a node to schedule transmission of a beacon message comprising:
    selecting random times for transmitting the beacon message,
    selecting random channels for transmitting the beacon-message;
    generating a beacon transmission schedule for the node based on the selected times and channels; and
    generating the beacon message, wherein the beacon message includes the beacon transmission schedule for the node transmitting the beacon message and additional beacon transmission schedules indicating when a plurality of other nodes will transmit beacons.

2. The method of claim 1, further comprising:
    transmitting the beacon message by the node according to the selected times and channels of its beacon transmission schedule.

3. The method of claim 1, wherein the beacon message includes identification of the node transmitting the beacon message.

4. The method of claim 1, wherein the selecting steps comprise selecting a sequence of times and selecting a sequence of channels.

5. The method of claim 1, wherein the random times and random channels comprise one or more of:
    pseudo-random number sequences;
    physical random number sequences; and
    unpredictable number sequences.

6. The method of claim 5, wherein the random times and random channels are pseudo-random number sequences.

7. The method of claim 1, wherein the beacon transmission schedules for the node and the plurality of other nodes each include transmission times for beacon messages in an ad hoc wireless network.

8. An apparatus for a network node to schedule transmission of a beacon message comprising:
    a random number generator for generating random times for transmitting the beacon message and for generating random channels for transmitting the beacon message; and
    a message generator for generating the beacon message, wherein the beacon message includes a beacon transmission schedule for the node based on the random times and the random channels and additional beacon transmission schedules indicating when a plurality of other network nodes will transmit beacons.

9. The apparatus of claim 8, further including a storage device for storing the beacon transmission schedule of the network node.

10. The apparatus of claim 8, further including a network node including a transmitter for transmitting beacon messages at the generated times and channels.

11. The apparatus of claim 10, wherein the transmitter generates beacon messages on wireless channels.

12. The apparatus of claim 11, wherein the wireless channels include at least one of radio, acoustic, magnetic, and infrared frequency channel.

13. The apparatus of claim 10, wherein the network node further includes a receiver for receiving beacon messages.

14. The apparatus of claim 8, wherein the apparatus further includes a transceiver and a power supply for selectively applying power to at least a portion of the transceiver.

15. The apparatus of claim 8, wherein the random number generator comprises one or more of a:
    pseudo-random number generator;
    physical random number generator; and
    unpredictable number generator.

16. The apparatus of claim 15, wherein the random number generator is a pseudo-random number generator.

17. The apparatus of claim 8, wherein the beacon transmission schedules for the node and the plurality of other network nodes each include transmission times for beacon messages in an ad hoc wireless network.

18. A method of generating a beacon message comprising:
    providing identifications of at least three nodes and random beacon transmission schedules for the at least three nodes, wherein each of the random beacon transmission schedules includes a time and a channel selected using a random selection process, and the random beacon transmission schedules indicate when the at least three nodes will transmit beacons; and
    incorporating the identifications and schedules in the beacon message.

19. A method of receiving a beacon message comprising:
    extracting a random beacon transmission schedule for a node from the message, wherein the random beacon transmission schedule includes a time and a channel selected using a random selection process;
    extracting, from the beacon message, a plurality of additional random beacon transmission schedules indicating when a plurality of additional nodes will transmit beacons; and
    listening at a receiver for another beacon message at a time and channel specified by one of the random beacon transmission schedules.

20. The method of claim 19, including powering on at least a portion of the receiver when a beacon message is expected to be transmitted according to the schedule.

21. An apparatus for generating a beacon message comprising:
    a node having a node identifier;
    a random number generator for generating a node beacon transmission schedule; and
    a processor for generating a beacon message including the node identifier, the beacon transmission schedule, a plurality of additional node identifiers, and beacon transmission schedules indicating when a plurality of nodes identified by the plurality of additional node identifiers will transmit beacons.

22. An apparatus for transmitting beacons in a wireless ad hoc network comprising: at least one node, said node
    selecting random times and random channels for transmission of beacons,
    storing the selected times and channels in at least one of at least three beacon transmission schedules, wherein the at least three beacon transmission schedules indicate when a plurality of nodes in the network will transmit beacons, and
    transmitting beacons containing the at least three beacon transmission schedules.

23. The apparatus of claim 22, wherein the node is equipped with a wireless communications transceiver.

24. The apparatus of claim 22, wherein the node is at least one of a router capable of network routing functions, and an endpoint for data traffic.

25. Computer-executable software code stored on a computer-readable medium, the computer-executable code being for facilitating the transmission of beacons in a wireless network, the computer-executable code comprising:
    computer-executable code for selecting random times and random channels for transmission of beacons;
    computer-executable code for storing the selected times and channels in at least one of at least three beacon transmission schedules, wherein the at least three beacon transmission schedules indicate when a plurality of nodes in the network will transmit beacons; and
    computer-executable code for transmitting beacons containing the at least three beacon transmission schedules.

26. A network communications apparatus comprising:
    means for selecting random times and random channels for transmission of beacons;
    means for storing the selected times and channels in at least one of at least three beacon transmission schedules, wherein the at least three beacon transmission schedules indicate when a plurality of nodes in the network will transmit beacons; and
    means for transmitting beacons containing the at least three beacon transmission schedules.

* * * * *